United States Patent
Jayaram et al.

(10) Patent No.: US 8,856,250 B2
(45) Date of Patent: Oct. 7, 2014

(54) COMMUNITY NOTIFICATION BASED ON PROFILE UPDATE

(75) Inventors: Vinodh Jayaram, Fremont, CA (US); Janet Sun Ryu, San Francisco, CA (US); Caroline Gaffney, San Francisco, CA (US); Elliot Shmukler, Palo Alto, CA (US); Avery Moon, Redwood Shores, CA (US)

(73) Assignee: LinkedIn Corporation, Mountain View, CA (US)

( * ) Notice: Subject to any disclaimer, the term of this patent is extended or adjusted under 35 U.S.C. 154(b) by 211 days.

(21) Appl. No.: 13/486,687

(22) Filed: Jun. 1, 2012

(65) Prior Publication Data

US 2013/0325945 A1    Dec. 5, 2013

(51) Int. Cl.
*G06F 15/16* (2006.01)
*H04L 12/58* (2006.01)
*G06Q 50/00* (2012.01)
*H04L 29/08* (2006.01)

(52) U.S. Cl.
CPC ............ *H04L 51/32* (2013.01); *G06Q 50/01* (2013.01); *H04L 67/22* (2013.01)
USPC ............ 709/206; 709/204; 709/223; 709/224

(58) Field of Classification Search
CPC ......... H04L 67/22; H04L 51/32; G06Q 50/01
USPC ................. 709/203, 204, 206, 217, 223, 224; 705/14.66, 319
See application file for complete search history.

(56) References Cited

U.S. PATENT DOCUMENTS

| | | | |
|---|---|---|---|
| 6,735,568 B1* | 5/2004 | Buckwalter et al. | 705/319 |
| 7,085,806 B1* | 8/2006 | Shapira | 709/203 |
| 7,933,856 B2* | 4/2011 | Verspoor et al. | 706/55 |
| 7,970,827 B1* | 6/2011 | Cumberbatch et al. | 709/204 |
| 8,126,759 B2* | 2/2012 | Robertson et al. | 705/7.19 |
| 8,214,375 B2* | 7/2012 | Fitzmaurice et al. | 707/749 |
| 2005/0256866 A1* | 11/2005 | Lu et al. | 707/5 |
| 2007/0233736 A1* | 10/2007 | Xiong et al. | 707/104.1 |
| 2007/0239610 A1* | 10/2007 | Lemelson | 705/51 |
| 2009/0271370 A1* | 10/2009 | Jagadish et al. | 709/204 |

(Continued)

OTHER PUBLICATIONS

Roth et al, "Suggesting Friends Using the Implicit Social Graph", Jul. 2010, ACM KDD Conference 2010.*

(Continued)

*Primary Examiner* — Ramy M Osman
(74) *Attorney, Agent, or Firm* — Schwegman Lundberg & Woessner, P.A.

(57) ABSTRACT

A notification machine may receive an update to a user profile that describes a user and indicates a group of users as being socially connected to the user by a social network. The update may reference a community (e.g., an employer or a club) of the user. The user profile may be modified by including a reference to the community within the user profile. The notification machine may identify a further user who is included in the community (e.g., employed by the employer, or part of the club). The further user may be socially unconnected to the user by the social network. The notification machine may then generate and provide a notification that the further user is employed by the employer. This notification may contain suggestions that the user initiate communication with the further user, become socially connected with the further user, or both.

21 Claims, 10 Drawing Sheets

(56) References Cited

U.S. PATENT DOCUMENTS

| | | | |
|---|---|---|---|
| 2010/0191844 A1* | 7/2010 | He et al. | 709/224 |
| 2010/0268661 A1* | 10/2010 | Levy et al. | 705/347 |
| 2011/0219089 A1* | 9/2011 | Robertson et al. | 709/206 |
| 2012/0041907 A1* | 2/2012 | Wang et al. | 709/228 |
| 2012/0209722 A1* | 8/2012 | Plut | 705/14.66 |
| 2013/0080523 A1* | 3/2013 | Rubinstein et al. | 709/204 |
| 2013/0097123 A1* | 4/2013 | McColgan et al. | 707/690 |
| 2013/0103758 A1* | 4/2013 | Alison et al. | 709/204 |
| 2013/0204863 A1* | 8/2013 | Rigole | 707/722 |
| 2013/0275513 A1* | 10/2013 | Borovyk et al. | 709/204 |

OTHER PUBLICATIONS

"Get notified when your LinkedIn contact changes job", http://techattitude.com/internet/get-notified-when-your-linkedin-contact-changes-job/, accessed May 15, 2012, (Jul. 8, 2011), 4 pgs.

"Job Change Notifier", http://www.jobchangenotifier.com/, accessed May 14, 2012, (2012), 1 pg.

* cited by examiner

COMMUNITY NOTIFICATION BASED ON PROFILE UPDATE

TECHNICAL FIELD

The subject matter disclosed herein generally relates to the processing of data. Specifically, the present disclosure addresses systems and methods of providing a community notification.

BACKGROUND

Contemporary social networking services may track relationships among users. For example, a social networking service may be provided by one or more social networking machines (e.g., servers) that maintain a user profile for a user, and the user profile may reference one or more additional users (e.g., by actual names, usernames, or other identifiers) that are socially connected with the user (e.g., friends, followers, or connections of the user). Conversely, one of these additional users may have a user profile (e.g., maintained by the social networking service) that references the user (e.g., by actual name, username, or other identifier). These additional users may constitute all or part of a group of users that are socially connected with the user (e.g., at least with respect to the social networking service).

BRIEF DESCRIPTION OF THE DRAWINGS

Some embodiments are illustrated by way of example and not limitation in the figures of the accompanying drawings.

DETAILED DESCRIPTION

Figure 1:
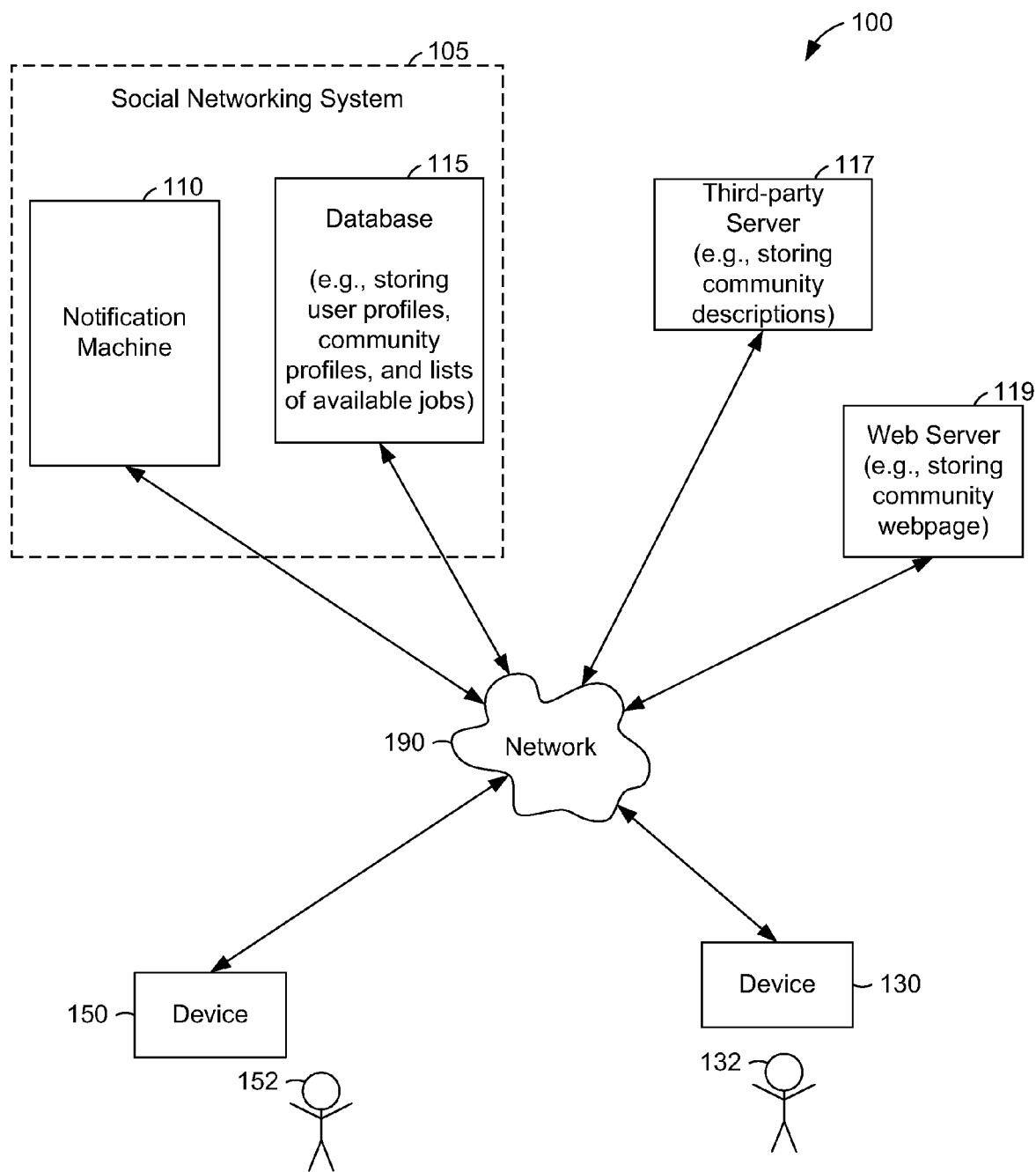
FIG. 1 is a network diagram illustrating a network environment suitable for providing a community notification based on a profile update, according to some example embodiments.

Example methods and systems are directed to provision of a community notification based on a profile update. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A user of a social networking service may update his user profile to indicate that the user has joined a community (e.g., indicate that the user has become an employee of an employer or a member of a social club). One or more machines that provide the social networking service may function as a notification machine that identifies a further user who is included in the community (e.g., employed by the employer or part of the social club). The notification machine may then provide a notification to the user that the further user is included in the community (e.g., employed by the same employer or part of the same social club). This notification may suggest that the user contact the further user, that the user perform a social networking activity (e.g., communicate, connect, link, befriend, or meet) with the further user, or both.

Accordingly, a notification machine (e.g., within a social networking system that provides a social networking service) may receive an update to a user profile. The user profile may describe a user and indicate a group of users as being socially connected to the user by a social network (e.g., maintained by the social networking service). The update to the user profile may reference a community (e.g., an employer or a club) of the user. For example, the update may include a reference to the community (e.g., a reference to the employer or to the club). The notification machine may modify the user profile based on the received update. In particular, the user profile may be modified by including a reference to the community (e.g., a reference to the employer or to the club) within the user profile of the user. Based on (e.g., in response to) the received update, the modified user profile, or both, the notification machine may identify a further user (e.g., another user of the social networking service) who is included in the same community (e.g., employed by the same employer, or part of the same club). The further user may be socially connected or socially unconnected to the user by the social network (e.g., as maintained by the social networking service). For example, the user and the further user may have no friends, followers, or connections shared in common (e.g., according to their user profiles stored by the social networking system). The notification machine may then generate a notification that the further user is employed by the same employer, and the notification machine may provide the notification to a device of the user. This notification may contain one or more suggestions that the user initiate communication with the further user, become socially connected with the further user, or both. This may have the effect of encouraging or prompting the user to get to know someone already in the community that the user recently joined (e.g., new coworkers, colleagues, mentors, friends, or associates).

In some example embodiments, the notification machine generates and provides a further notification to the further user (e.g., to a further device associated with the further user). This further notification may contain one or more suggestions that the further user initiate communication with the user, become socially connected with the user, or both. This may have the effect of encouraging or promising the further user to get to know someone who recently joined the community (e.g., the user).

FIG. 1 is a network diagram illustrating a network environment 100 suitable for providing a community notification based on a profile update, according to some example embodiments. The network environment 100 includes a notification machine 110, a database 115, a third-party server 117, a web server 119, and devices 130 and 150, all communicatively coupled to each other via a network 190. The notification machine 110, the database 115, the third-party server 117, the web server 119, and the devices 130 and 150 may each be implemented in a computer system, in whole or in part, as described below with respect to FIG. 10.

As shown, the notification machine 110, the database 115, or both, may form all or part of a social networking system 105 that provides all or part of a social networking service (e.g., to various users). Details of the notification machine 110 are provided below with respect to FIG. 6. The database 115 may be configured to store one or more user profiles (e.g., corresponding to one or more users of the social networking service provided by the social networking system 105), one or more community profiles (e.g., a description of a community maintained by the social networking service), one or more lists of available jobs (e.g., a listing of jobs available within a community), or any suitable combination thereof.

The third-party server 117 may store one or more community descriptions (e.g., a description of a community maintained by a third party). In some example embodiments, the third-party server 117 stores all or part of the information described above with respect to the database 115 (e.g., all or part of the user profiles, community profiles, lists of available jobs, or any suitable combination thereof).

The web server 119 may store one or more webpages that correspond to one or more communities. For example, where the community is an employer, the web server 119 may be the employer's web server that hosts a website (e.g., an official website) of the employer.

Also shown in FIG. 1 are users 132 and 152. Each of the users 132 and 152 may be users of the social networking service provided by the social networking system 105. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a graph database, a hierarchical data store, or any suitable combination thereof. Moreover, any two or more of the machines illustrated in FIG. 1 may be combined into a single machine, and the functions described herein for any single machine may be subdivided among multiple machines.

The network 190 may be any network that enables communication between machines (e.g., server machine 110 and the devices 130 and 150). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
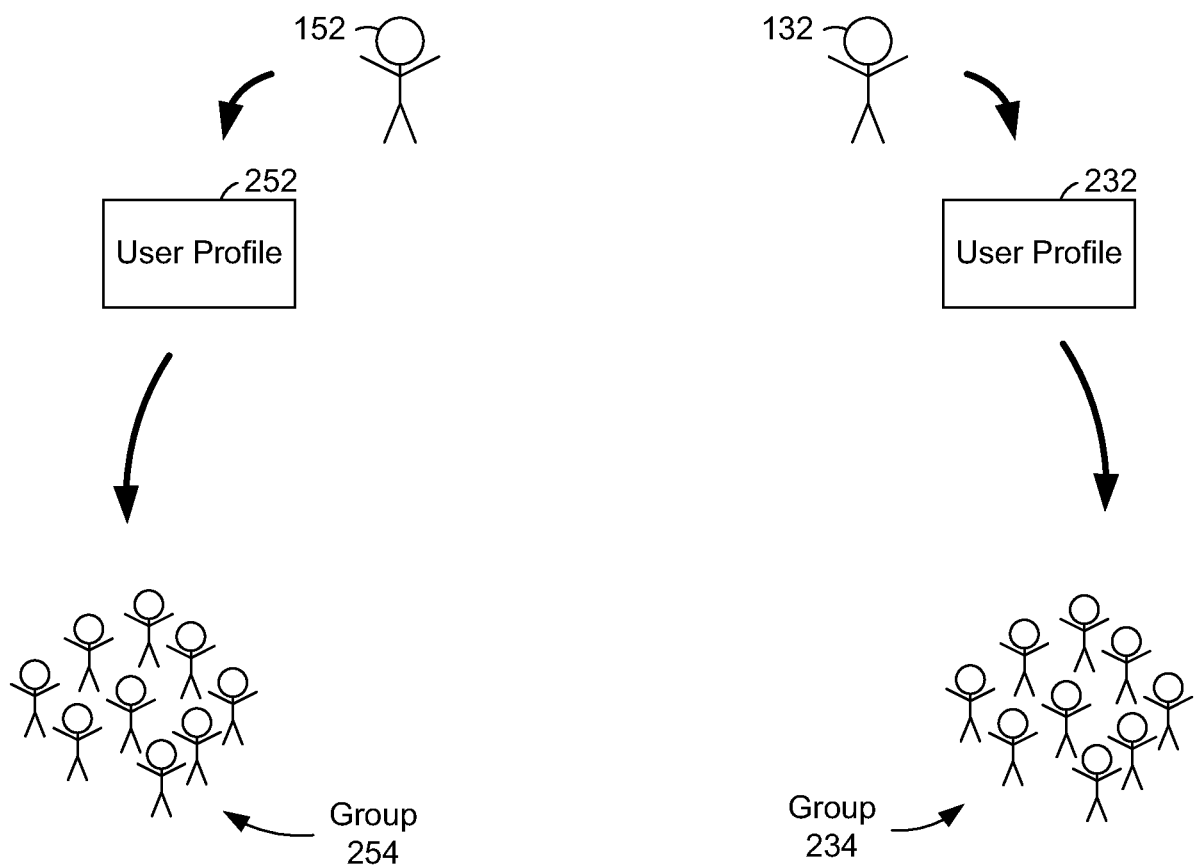
FIG. 2 is a conceptual diagram illustrating users of a social networking service being described by user profiles that indicate groups of users socially connected to the user by a social network, according to some example embodiments.

FIG. 2 is a conceptual diagram illustrating users 132 and 152 being respectively described by user profiles 232 and 252, according to some example embodiments. As shown in FIG. 2, the user 132 is described by the user profile 232, and the user profile 232 indicates a group 234 of users (e.g., of the social networking service provided by the social networking system 105) that are socially connected to the user 132 by one or more social networks (e.g., by the social networking service provided by the social networking system 105). For example, the group 234 may be a set of users that are directly connected (e.g., with one degree or "hop" of separation) to the user 132. As another example, the group 234 may be a set of users that are directly or indirectly connected (e.g., with three or fewer degrees or "hops" of separation) to the user 132. The user profile 232 may indicate the group 234 by referencing (e.g., including a reference to) each member of the group 234 (e.g., by actual name, username, or other identifier).

Similarly, the user 152 is described by the user profile 252, and the user profile 252 indicates a group 254 of users (e.g., of the social networking service provided by the social networking system 105) that are socially connected to the user 152 by one or more social networks (e.g., by the social networking service provided by the social networking system 105). For example, the group 254 may be a set of users that are directly connected (e.g., with one degree or "hop" of separation) to the user 152. As another example, the group 254 may be a set of users that are directly or indirectly connected (e.g., with three or fewer degrees or "hops" of separation) to the user 152. The user profile 252 may indicate the group 254 by referencing (e.g., including a reference to) each member of the group 254 (e.g., by actual name, username, or other identifier). In some example embodiments, the group 234 and the group 254 may have one or more users in common (e.g., a common friend to both the user 132 and the user 152). In certain example embodiments, the group 234 and the group 254 share no members in common.

Figure 3:
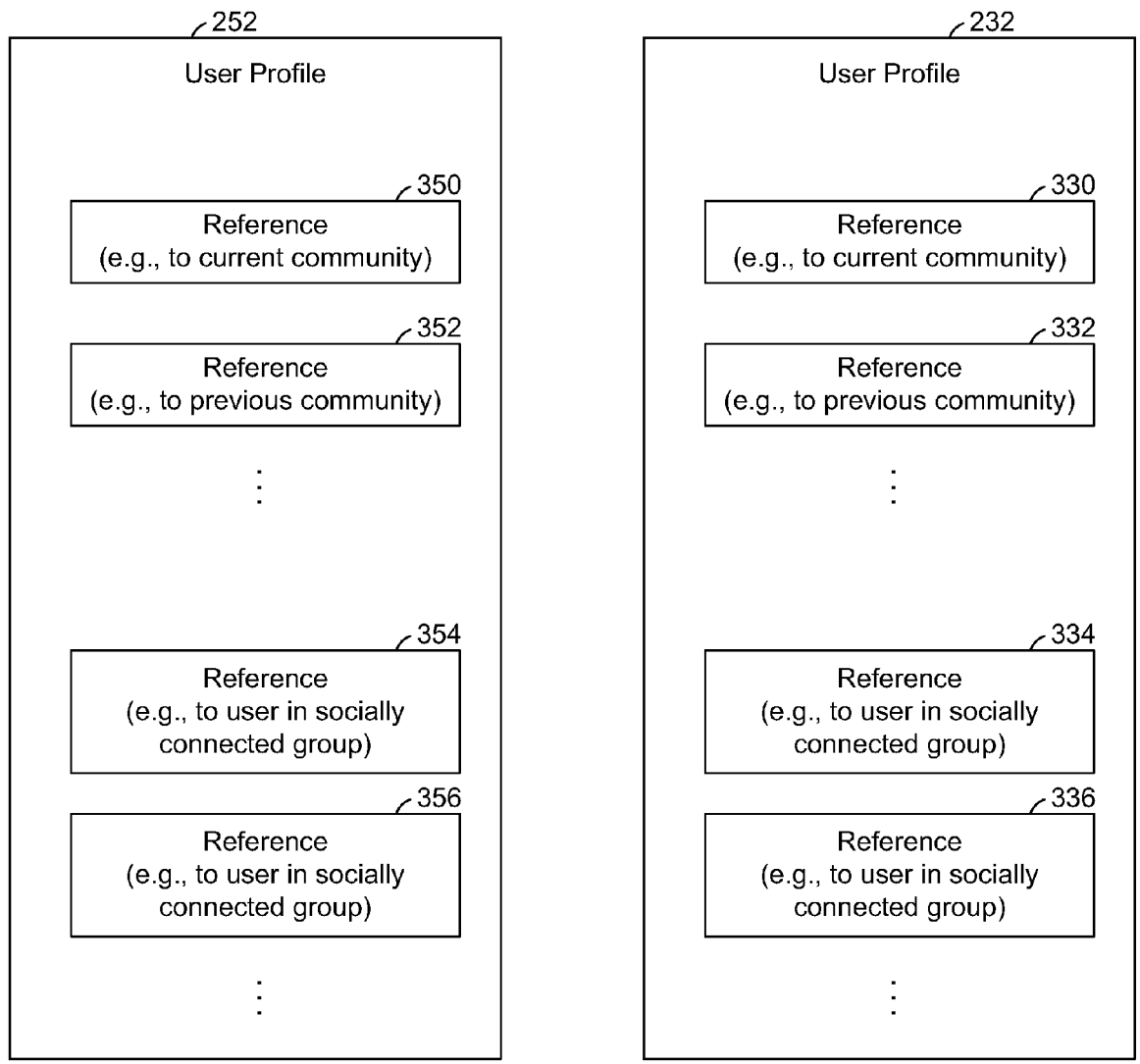
FIG. 3 is a block diagram illustrating user profiles, according to some example embodiments.

FIG. 3 is a block diagram illustrating user profiles 232 and 252, according to some example embodiments. As shown in FIG. 3, the user profile 232 includes references 330, 332, 334, and 336 (e.g., among other references). Any one or more of the references 330, 332, 334, and 336 may be an identifier, a pointer, a link (e.g., a hyperlink), or any suitable combination thereof that identifies a target being referenced. In the example shown in FIG. 3, the reference 330 may be a reference to a current community (e.g., a current employer or a current club) of the user 132. The reference 332 may be a reference to a previous community (e.g., a previous employer or a previous club) of the user 132. The references 334 and 336 are shown as referencing users in the group 234 of users that are socially connected to the user 132 by the social networking system 105 (e.g., users who are socially connected to the user 132).

Similarly, the user profile 252 may include references 350, 352, 354, and 356 (e.g., among other references). Any one or more of the references 350, 352, 354, and 356 may be an identifier, a pointer, a link (e.g., a hyperlink), or any suitable combination thereof that identifies a target being referenced. In the example shown in FIG. 3, the reference 350 may be a reference to a current community (e.g., a current employer or a current club) of the user 152. The reference 352 may be a reference to a previous community (e.g., a previous employer or a previous club) of the user 152. The references 354 and 356 are shown as referencing users in the group 254 of users that are socially connected to the user 152 by the social networking system 105. According to various example embodiments, an indication that a user is socially connected to another user may be defined by the social networking service provided by the social networking system 105. For example, a user may be socially connected to another user if one or both of their respective user profiles contains an indication that the two users are socially connected (e.g., separated by three or fewer degrees of separation with respect to the social networking service), and a user may be socially unconnected to another user if one or both of their respective user profiles contains an indication that the two users are socially unconnected (e.g., separated by four or more degrees of separation with respect to the social networking service).

In some example embodiments, one or more of the references in a user profile (e.g., references 350, 352, 354, and 356 in the user profile 252) are represented within a social graph (e.g., rather than within the user profile itself). For example, a social networking service provided by the social networking system 105 may generate, store, and maintain a social graph as a multi-dimensional array of nodes, in which each node represents an entity (e.g., a user, a member, a group of users, or a community). In such a social graph, nodes may be related to one another by one or more edges (e.g., connections) that represent relationships between nodes. One user may be indicated as being socially connected to another user by the type of edge or types of edges linking the nodes that represent the two users, the number of edges linking the nodes that represent the two users, or any suitable combination thereof. For example, a user may be socially connected to another user if the number of edges between their respective nodes is three or fewer (e.g., three degrees of separation maximum), whereas the user may be socially unconnected to a further user if the number of edges between their respective nodes is more than three (e.g., four or more degrees of separation).

Figure 4:
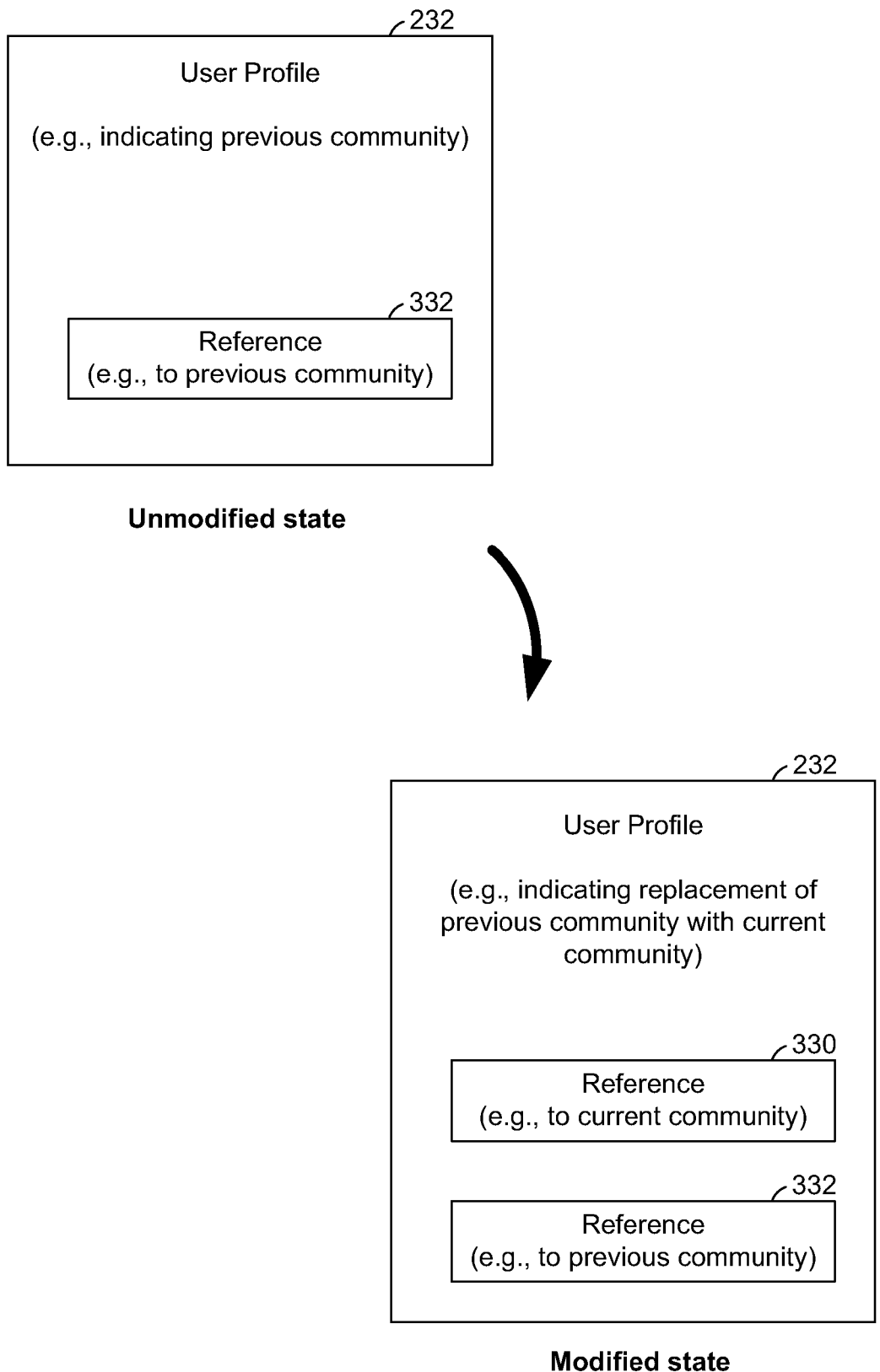
FIG. 4 is a state diagram illustrating access of a user profile in an unmodified state and alteration of the user profile to a modified state, according to some example embodiments.

FIG. 4 is a state diagram illustrating access of the user profile 232 in an unmodified state and alteration of the user profile 232 to a modified state, according to some example embodiments. In the unmodified state, the user profile 232 includes the reference 332 (e.g., a reference to a previous community of the user 132). In the unmodified state, the user profile 232 may be accessed (e.g., from the database 115) by the notification machine 110. A curved arrow indicates a transition from the unmodified state to the modified state. In the modified state, the user profile 232 includes the reference 330 (e.g., a reference to a current community of the user 132), as well as the reference 332 (e.g., the reference to the previous community). The transition from the unmodified state to the modified state may result from the notification machine 110 modifying (e.g., altering) the user profile 232 (e.g., based on an update that includes the reference 330).

Figure 5:
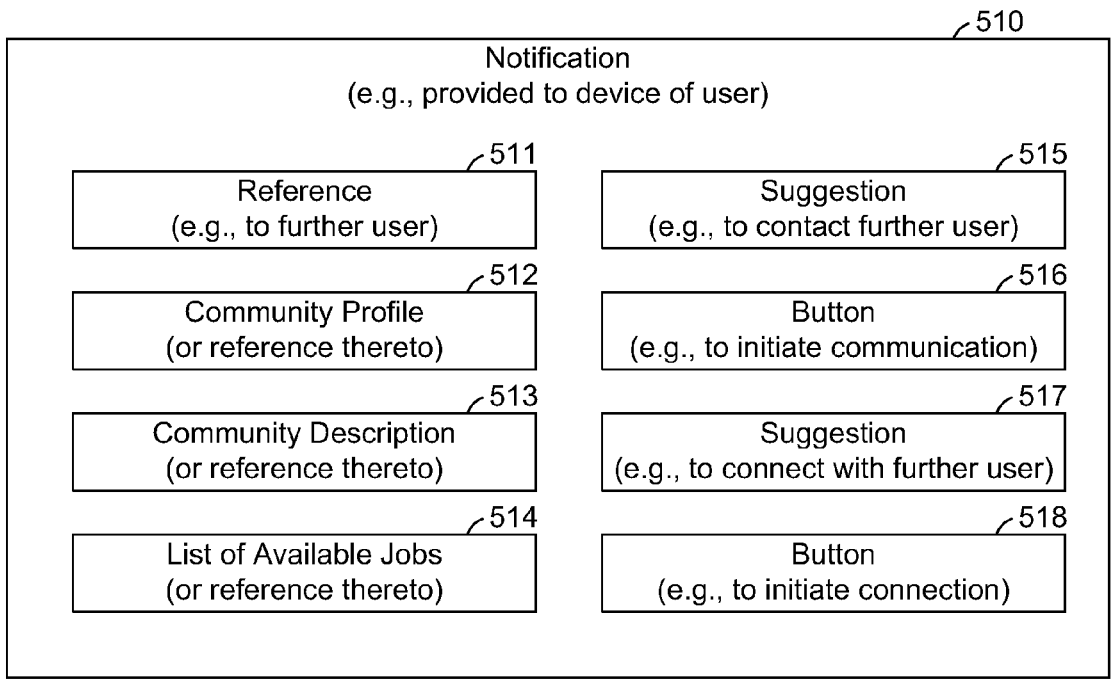
FIG. 5 is a block diagram illustrating notifications that may be provided by a notification machine, according to some example embodiments.
Figure 5:
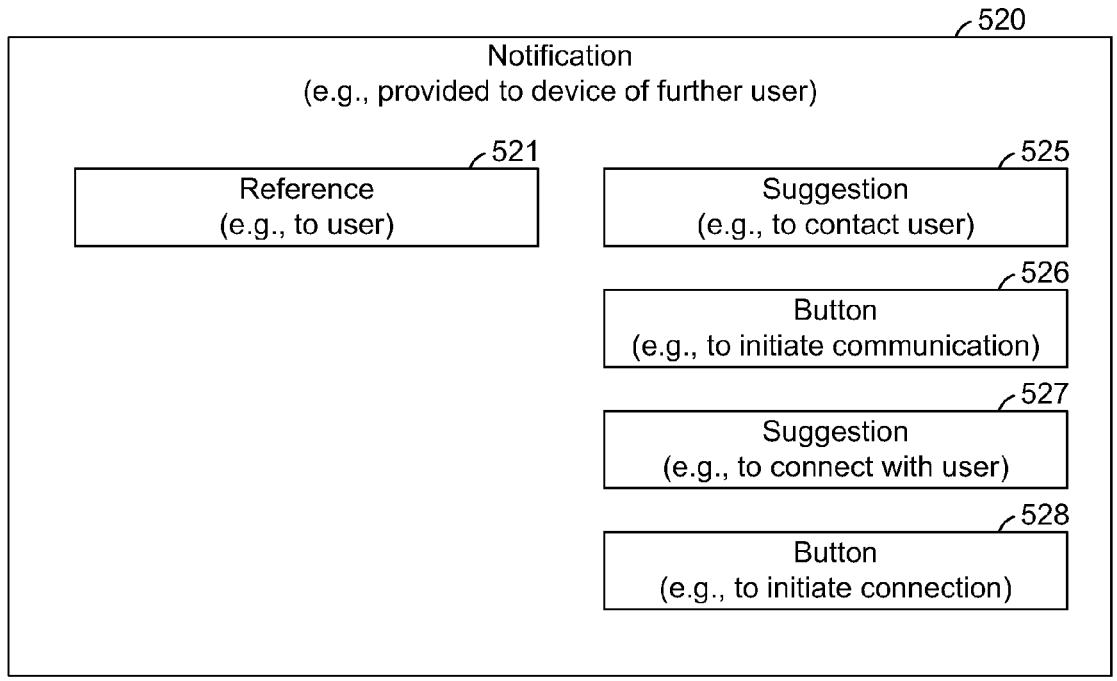

FIG. 5 is a block diagram illustrating notifications 510 and 520 that may be generated, provided, or both, by the notification machine 110, according to some example embodiments. As shown, the notification 510 may include a reference 511 to a user (e.g., user 152), a community profile 512, a community description 513, a list of available jobs 514, a suggestion 515 to contact a user (e.g., user 152), a button 516 to initiate communication to such a user (e.g., user 152), a suggestion 517 to connect with a user (e.g., user 152), and a button 518 to initiate a connection with such a user (e.g., user 152), or any suitable combination thereof. For example, the reference 511 may be a reference to the user 152 (e.g., an actual name, a username, or other identifier of the user 152), where the user 152 may be included in a community referenced in an update to the user profile 232, but socially unconnected to the user 132 by the social networking service provided by the social networking system 105.

The community profile 512 may be a profile that is stored in the database 115 and describes the community referenced in the update to the user profile 232. In some example embodiments, the notification 510 includes a reference (e.g., a hyperlink) to the community profile 512 (e.g., as stored in the database 115).

The community description 513 may be a third-party description of the community referenced in the update to the user profile 232 and may be accessible from the third-party server 117. In some example embodiments, the notification 510 includes a reference to the community description 513 (e.g., as stored by the third-party server 117).

The list of available jobs 514 may be a listing of one or more employment opportunities that are available in the community referenced in the update to the user profile 232 and may be stored in the database 115. In some example embodiments, the notification 510 includes a reference to the list of available jobs 514 (e.g., stored by the database 115).

The suggestion 515 to contact a user may be a suggestion that the user 132 initiate communication with the user 152. The user 152 may be included in a community referenced in an update to the user profile 232 of the user 132, and the user 152 may be socially unconnected to the user 132 by the social networking service provided by the social networking system 105. The button 516 may be operable to initiate the communication suggested by the suggestion 515.

The suggestion 517 to initiate a connection with a user may be a suggestion that the user 132 become socially connected with the user 152 via one or more social networking services (e.g., the social networking service provided by the social networking system 105). The button 518 may be operable to initiate the social networking activity (e.g., the connection) suggested by the suggestion 517. According to various example embodiments, the notification 510 may be generated by the notification machine 110 and provided by the notification machine 110 to the user 132 (e.g., via the device 130).

As shown in FIG. 5, the notification 520 may include a reference 521 to a user (e.g., user 132), a suggestion 525 to contact a user (e.g., user 132), a button to initiate communication with such a user (e.g., user 132), a suggestion 527 to connect with a user (e.g., user 132), and a button 528 to initiate a connection with such a user (e.g., user 132), or any suitable combination thereof. For example, the reference 521 may be a reference to the user 132 (e.g., an actual name, a username or other identifier of the user 132), where the user 132 is a member (e.g., a new member or a recently joined member) of a community referenced in an update to the user profile 232, but socially unconnected with the user 152 by the social networking service provided by the social networking system 105.

The suggestion 525 to contact a user may be a suggestion that the user 152 initiate communication with the user 132. The user 132 may be included in a community referenced in an update to the user profile 232 of the user 132, and the user 132 may be socially unconnected to the user 152 by the social networking service provided by the social networking system 105. The button 526 may be operable to initiate the communication suggested by the suggestion 525.

The suggestion 527 to initiate a connection with a user may be a suggestion that the user 152 become socially connected with the user 132 via one or more social networking services (e.g., the social networking service provided by the social networking system 105). The button 528 may be operable to initiate the social networking activity (e.g., the connection) suggested by the suggestion 527. According to various example embodiments, the notification 520 may be generated by the notification machine 110 and provided by the notification machine 110 to the user 152 (e.g., via the device 150).

Figure 6:
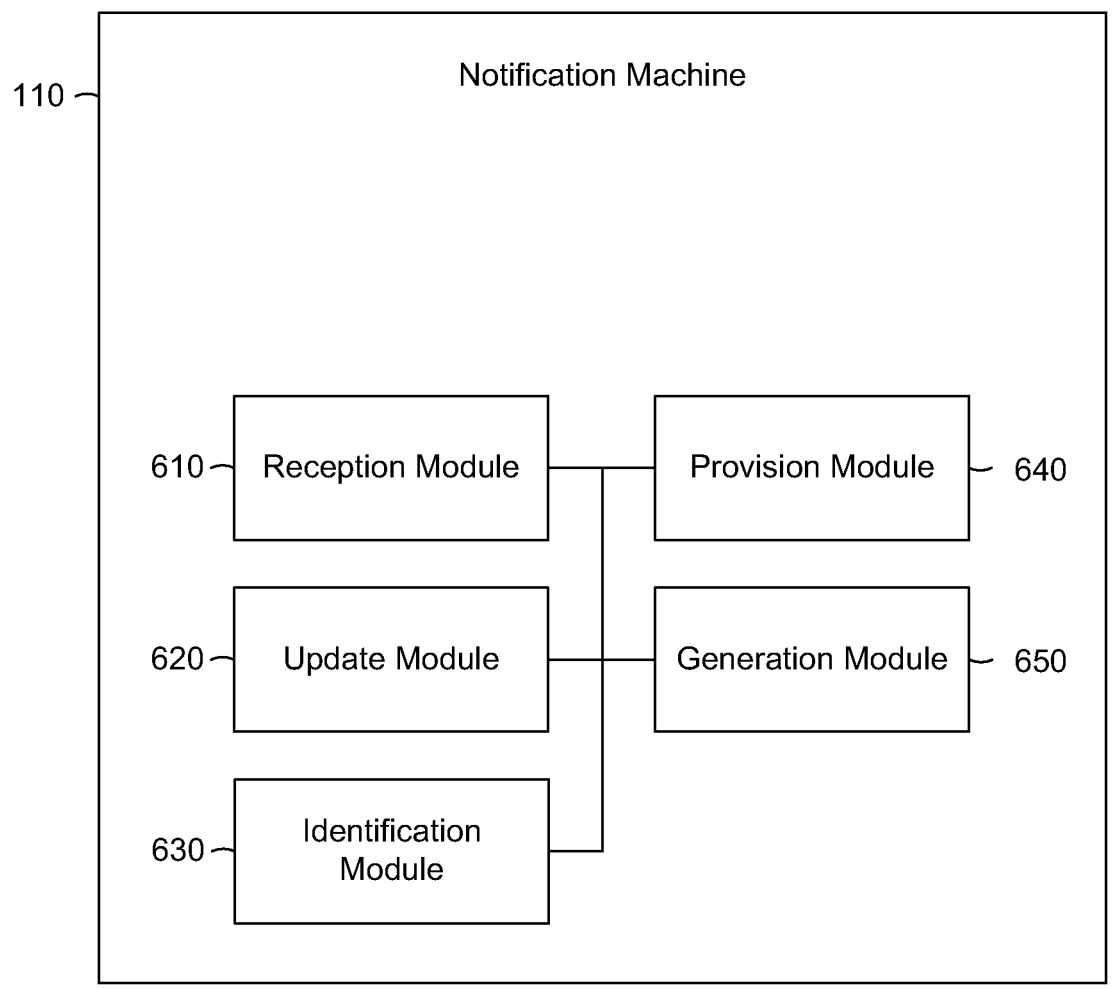
FIG. 6 is a block diagram illustrating components of the notification machine, according to some example embodiments.

FIG. 6 is a block diagram illustrating components of the notification machine 110, according to some example embodiments. The notification machine 110 may include a reception module 610, an update module 620, an identification module 630, a provision module 640, and a generation module 650, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. The modules of the notification machine 110 are described in greater detail below with respect to FIG. 7-10.

Figure 7:
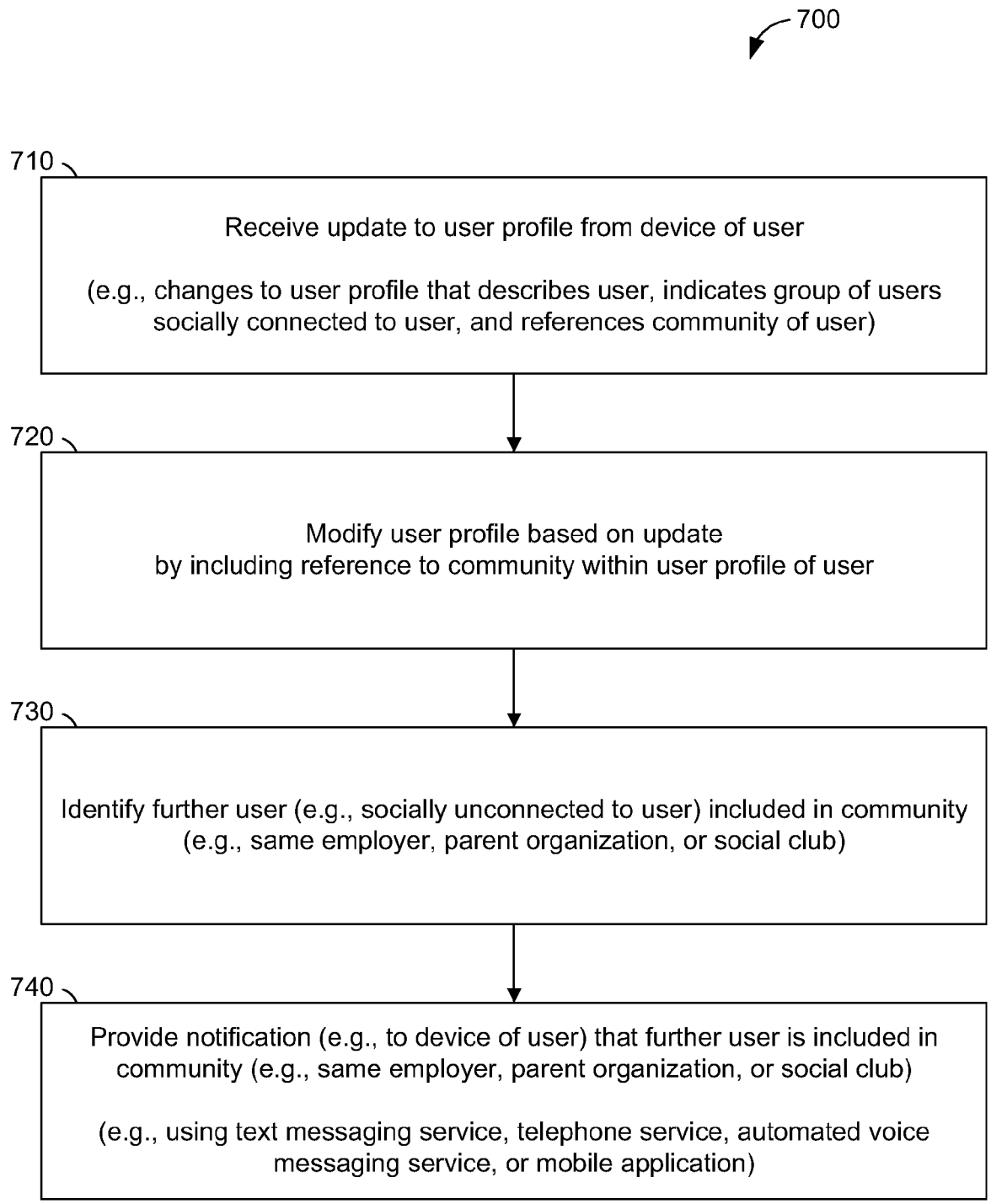
FIG. 7-9 are flowcharts illustrating operations of the notification machine in performing a method of providing a community notification based on a profile update, according to some example embodiments.
Figure 8:
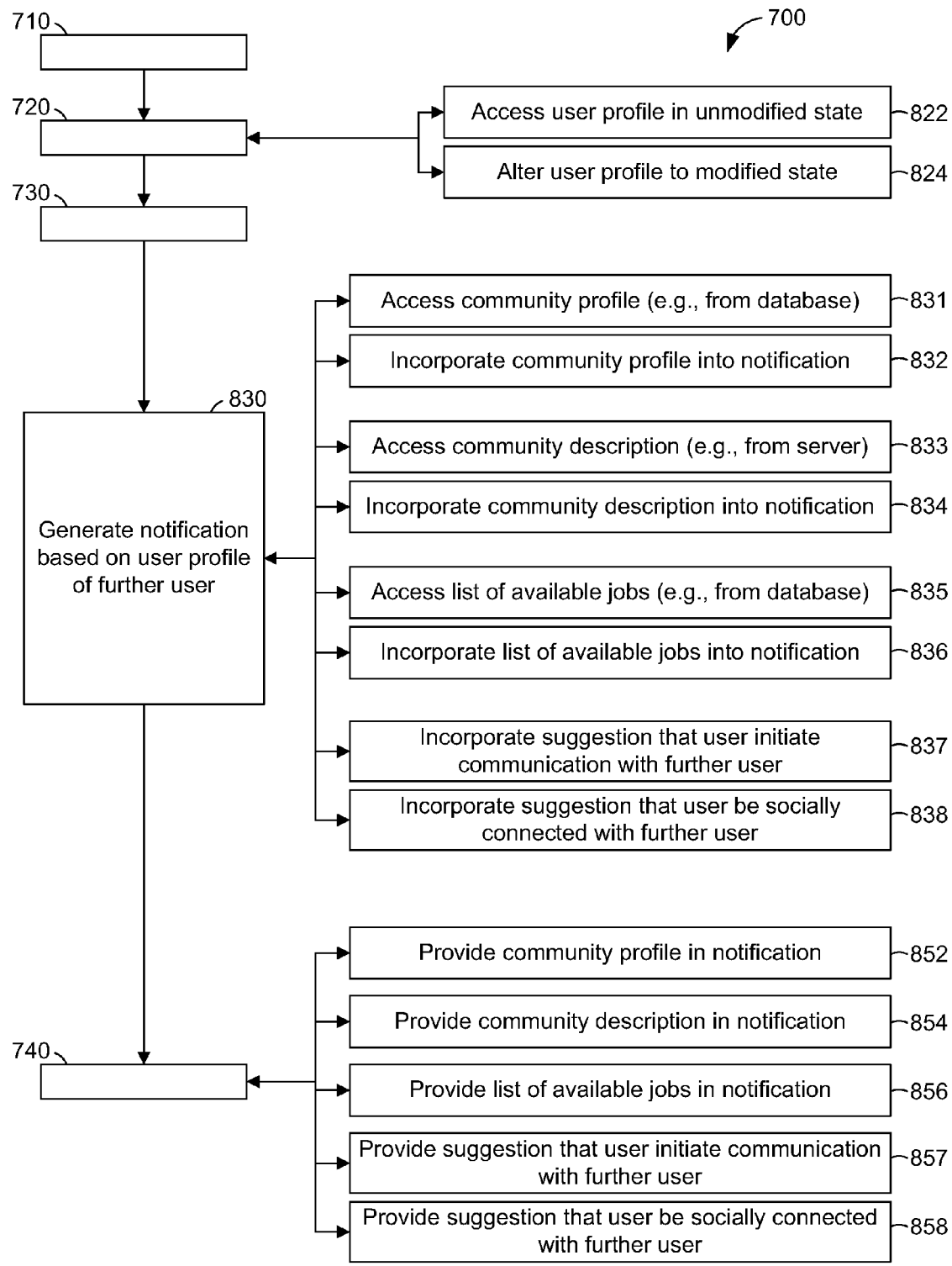
Figure 9:
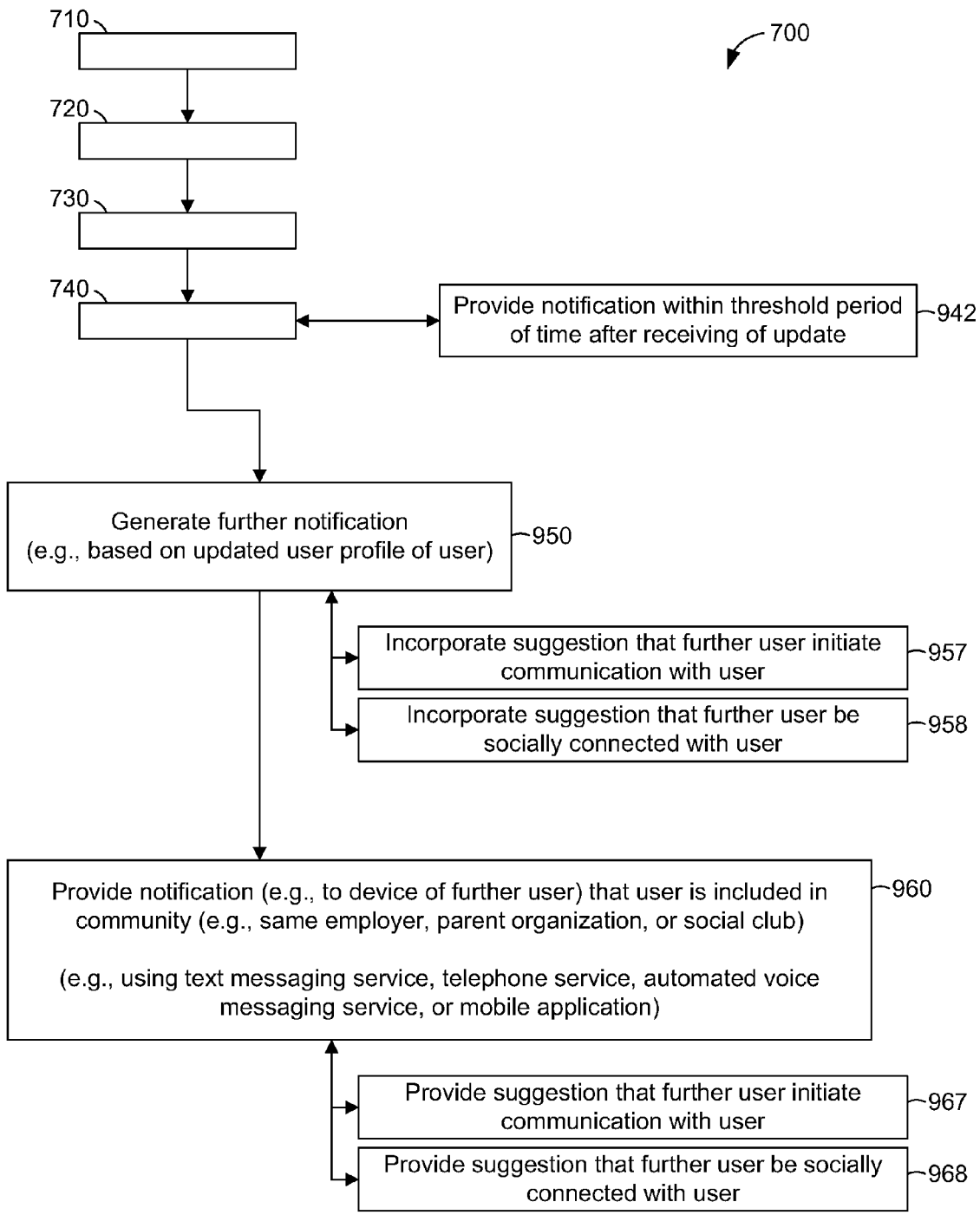

FIG. 7-9 are flowcharts illustrating operations of the notification machine 110 in performing a method 700 of providing a notification (e.g., notification 510, notification 520, or both) based on a profile update, according to some example embodiments. Operations in a method 700 may be performed by the notification machine 110, using modules described above with respect to FIG. 6. As shown in FIG. 7, example embodiments of the method 700 include operations 710, 720, 730, and 740.

In operation 710, the reception module 610 receives an update to the user profile 232. This update may be received from the device 130, which may correspond to the user 132. The received update may be a submission of one or more commands or requests that the user profile 232 be modified (e.g., as discussed above with respect to FIG. 4). The update may be received from the device 130 and may reference a community of the user 132 (e.g., a community that includes the user 132). For example, the update may include the reference 330 (e.g., as a reference to a current community of the user 132).

Moreover, the community of the user 132 may be indicated (e.g., defined) by an employer of the user 132 (e.g., an company or business that employs the user 132, a workplace or campus of the employer, a division or department of the employer, or any suitable combination thereof), a parent organization (e.g., a parent company or business), a club (e.g., a social club), or any other community (e.g., group of users) of which membership may be indicated by the social networking service provided by the social networking system 105. In some example embodiments, the community is a current community of the user 132, and the update may include a replacement (e.g., a request for a replacement) of a previous community of the user 132 with the current community. For example, the current community may be a current employer of the user 132, and the previous community may be a previous employer of the user 132. As another example, the current community may be a current club of the user 132, and the previous community may be a previous club of the user 132.

In operation 720, the update module 620 modifies the user profile 232. The modification of the user profile 232 may be based on the update received in operation 710. For example, the update may include the reference 330, and the user profile 232 may be modified by including (e.g., incorporating or adding) the reference 330 (e.g., as a reference to a community that includes the user 132) in the user profile 232 (e.g., as discussed above with respect to FIG. 4).

In operation 730, the identification module 630 identifies the user 152 (e.g., a further user) as a user that is included in the community referenced in the update received in operation 710, a user that is socially unconnected to the user 132 (e.g., by the social networking service provided by the social networking system 105), or both. Moreover, the identification module 630 may perform this identification based on the update received in operation 710, the user profile 252, or any suitable combination thereof. For example, the identification module 630 may identify the user 152 based on the reference 350 in the user profile 252 indicating that the user 152 is part of the community referenced in the update received in 710 (e.g., by matching the community indicated in the reference 350 to the community referenced in the reference 330).

In operation 740, the provision module 640 provides the notification 510 indicating that the user 152 is included (e.g., as an existing member) in the community referenced in the update that was received in operation 710. The notification 510 may be provided to the device 130 of the user 132. According to various example embodiments, the providing of the notification 510 may be performed using an email service (e.g., an email), a text messaging service (e.g., a text message), a telephone service (e.g., a phone call), an automated voice messaging service (e.g., a "robo-call"), a mobile app (e.g., executing on the device 130), or any suitable combination thereof.

As shown in FIG. 8, the method 700 may include any one or more of operations 822, 824, 830, 831, 832, 833, 834, 835, 836, 837, 838, 852, 854, 856, 807, and 858. One or more of operations 822 and 824 may be performed as part (e.g., a precursor task, a subroutine, or a portion) of operation 720, in which the update module 620 modifies the user profile 232 based on the update received in operation 710. In operation 822, the update module 620 accesses the user profile 232 (e.g., from the database 115) in an unmodified state from which the reference 330 is absent (e.g., as shown in FIG. 4). In operation 824, the update module 620 modifies (e.g., alters) the user profile 232 (e.g., within the database 115) to a modified state in which the reference 330 is included in the user profile 232 (e.g., as shown in FIG. 4).

According to various example embodiments, operation 830 is performed prior to operation 740, in which the provision module 640 may provide the notification 510 to the device 130. In operation 830, the generation module 650 generates the notification 510 based on the user profile 252. As noted above, the user profile 252 describes the user 152 and indicates the group 254 of users as being socially connected to the user 152 by one or more social networks (e.g., a social network maintained by a social networking service provided by the social networking system 105). One or more of operations 831-838 may be performed as part of operation 830.

In operation 831, the generation module 650 accesses the community profile 512 (e.g., from the database 115) or a reference thereto. In operation 832, the generation module 850 incorporates the community profile 512 into the notification 510. Accordingly, in example embodiments that include operation 832, operation 852 may be performed as part of operation 740, in which the provision module 640 provides the notification 510. In operation 852, the provision module 640 provides the community profile 512, or a reference thereto, in the notification 510.

In operation 833, the generation module 650 accesses the community description 513 (e.g., from the third-party server 117) or a reference thereto. In operation 834, the generation module 650 incorporates the community description 513 into the notification 510. Accordingly, in example embodiments that include operation 834, operation 854 may be performed as part of operation 740. In operation 854, the provision module 640 provides the community description 513, or a reference thereto, in the notification 510.

In operation 835, the generation module 650 accesses the list of available jobs 514 (e.g., from the database 115) or a reference thereto. In operation 836, the generation module 650 incorporates the list of available jobs 514 into the notification 510. Accordingly, in example embodiments that include operation 836, operation 856 may be performed as part of operation 740. In operation 856, the provision module 640 provides the list of available jobs 514, or a reference thereto, in the notification 510.

In operation 837, the generation module 650 incorporates the suggestion 515 into the notification 510. As noted above, the suggestion 515 may be a suggestion that the user 132 initiate a communication with the user 152. In some example embodiments, the generation module 650 may generate the suggestion 515 for inclusion in the notification 510. Accordingly, in example embodiments that include operation 837, operation 857 may be performed as part of operation 740, in which the provision module 640 provides the notification 510. In operation 857, the provision module 640 provides the suggestion 515 in the notification 510. In some example embodiments, operation 837 includes the generation module 650 generating and incorporating the button 516 into the notification 510.

In operation 838, the generation module 650 incorporates the suggestion 517 into the notification 510. As noted above, the suggestion 517 may be a suggestion that the user 132 become socially connected with the user 152. In some example embodiments, the generation module 650 may generate the suggestion 517 for inclusion in the notification 510. Accordingly, in example embodiments that include operation 838, operation 858 may be performed as part of operation 740. In operation 858, the provision module 640 provides a suggestion 517 in the notification 510. In some example embodiments, operation 838 includes the generation module 650 generating and incorporating the button 518 into the notification 510.

As shown in FIG. 9, the method 700 may include any one or more of operations 942, 950, 957, 958, 960, 967, and 968. Operation 942 may be performed as part (e.g., a precursor task, a subroutine, or a portion) of operation 740, in which the provision module 640 provides the notification 510 (e.g., to the device 130). In operation 942, the provision module 640 provides a notification 510 within a period of time (e.g., a threshold period of time, a predetermined period of time, or any suitable combination thereof) after the receiving of the update in operation 710. As noted above, the update received in operation 710 may reference the community of the user 132 (e.g., by inclusion of the reference 330).

In certain example embodiments, operation 950 may be performed after operation 740, in which the user 132 may be provided (e.g., by the device 130) with the notification 510. In operation 950, the generation module 650 generates the notification 520 indicating that the user 132 is included (e.g., as a new member) in the community referenced in the update that was received in operation 710. Operation 950 may be performed based on the user profile 232 (e.g., in response to operation 720, in which the user profile 232 is updated by the update module 620). For example, operation 950 may be performed based on the reference 330 being included in the user profile 232. One or more of operations 957 and 958 may be performed as part of operation 950.

In operation 957, the generation module 650 incorporates the suggestion 525 into the notification 520. As noted above, the suggestion 525 may be a suggestion that the user 152 initiate a communication with the user 132. In some example embodiments, the generation module 650 may generate the suggestion 525 for inclusion in the notification 520. In some example embodiments, operation 957 includes the generation module 650 generating and incorporating the button 526 into the notification 520.

In operation 958, the generation module 650 incorporates the suggestion 527 into the notification 520. As noted above, the user 152 may be socially unconnected to the user 132 (e.g., according to one or more social networks), and the suggestion 527 may be a suggestion that the user 152 become socially connected with the user 132. In some example embodiments, the generation module 650 may generate the suggestion 527 for inclusion in the notification 520. In some example embodiments, operation 958 includes the generation module 650 generating and incorporating the button 528 into the notification 520.

In operation 960, the provision module 640 provides the notification 520 indicating that the user 132 is included (e.g., as a new member) in the community referenced in the update that was received in operation 710. The notification 520 may be provided to the device 150 of the user 152. According to various example embodiments, the providing of the notification 520 may be performed using an email service (e.g., an email), a text messaging service (e.g., a text message), a telephone service (e.g., a phone call), an automated voice messaging service (e.g., a "robo-call"), a mobile app (e.g., executing on the device 130), or any suitable combination thereof.

In example embodiments that include operation 957, operation 967 may be performed as part of operation 960, in which the provision module 640 provides the notification 520. In operation 957, the provision module 640 provides the suggestion 525 in the notification 520. In some example embodiments, the provision module 640 also provides the button 526 in the notification 520.

In example embodiments that include operation 958, operation 968 may be performed as part of operation 960. In operation 968, the provision module 640 provides the suggestion 527 in the notification 520. In some example embodiments, the provision module 640 also provides the button 528 in the notification 520.

According to various example embodiments, one or more of the methodologies described herein may facilitate provision of a community notification based on a user's profile update. Moreover, one or more of the methodologies described herein may facilitate discovery of new colleagues, friends, or mentors for a new member of a community. Furthermore, one or more the methodologies described herein may facilitate discovery of new colleagues, friends, or associates for a pre-existing member of a community. Hence, one or more the methodologies described herein may facilitate computer-assisted introductions between one or more persons.

When these effects are considered in aggregate, one or more of the methodologies described herein may obviate a need for certain efforts or resources that otherwise would be involved in introducing persons or in identifying persons for potential introduction to one another. Efforts expended by a user in identifying potential new social connections may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 10:
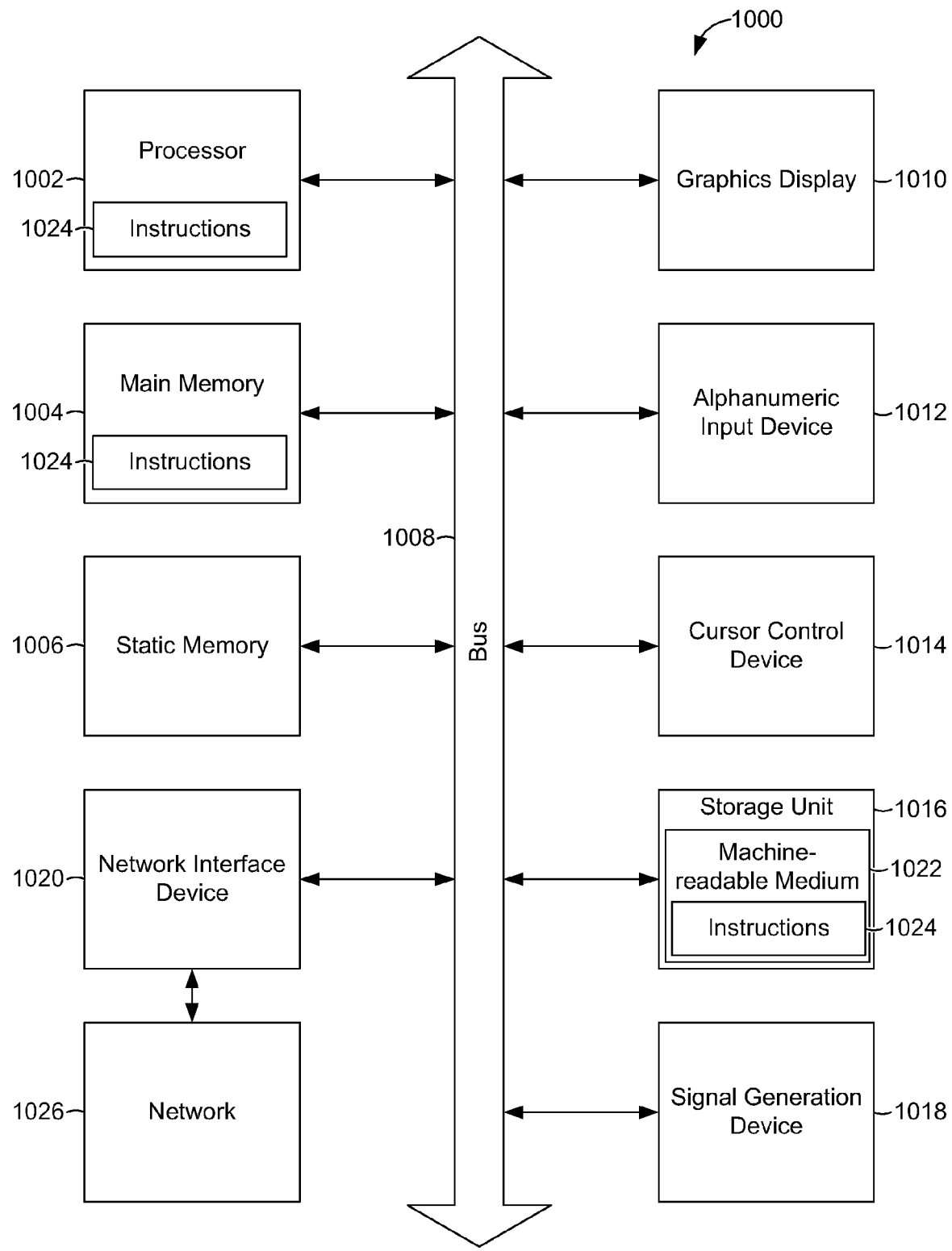
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system and within which instructions 1024 (e.g., software) for causing the machine 1000 to perform any one or more of the methodologies discussed herein may be executed. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a peer-to-peer (or distributed) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 (e.g., software) embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 (e.g., network 190) via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1000), such that the instructions, when executed by one or more processors of the machine (e.g., processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
receiving an update to a user profile that describes a user and indicates a group of users socially connected to the user by a social network,
the update referencing a community of the user and being received from a device of the user;
modifying the user profile based on the update by including a reference to the community of the user within the user profile;
identifying a further user that is included in the community and that is socially unconnected to the user by the social network,
the identifying of the further user being performed by a processor of a machine based on the update that references the community of the user; and
generating and providing a notification that the further user is included in the community,
the generating of the notification incorporating a community profile of the community into the notification,
the notification being provided to the device of the user and including the community profile of the community.

2. The method of claim 1, wherein:
the community is a current community of the user; and
the update includes a replacement of a previous community of the user with the current community of the user.

3. The method of claim 2, wherein:
the current community of the user is a current employer of the user; and
the previous community of the user is a previous employer of the user.

4. The method of claim 2, wherein:
the current community of the user is a current club of the user; and
the previous community of the user is a previous club of the user.

5. The method of claim 1, wherein:
the providing of the notification occurs within a threshold period of time after the receiving of the update that references the community of the user.

6. The method of claim 1, wherein:
the modifying of the user profile based on the update includes accessing the user profile in an unmodified state from which the reference to the community is absent and altering the user profile to a modified state in which the reference to the community is included.

7. The method of claim 1, wherein:
the providing of the notification that the further user is included in the community includes providing a suggestion that the user initiate a communication with the further user.

8. The method of claim 1, wherein:
the providing of the notification that the further user is included in the community includes providing a suggestion that the user become socially connected with the further user.

9. The method of claim 1, wherein:
the providing of the notification that the further user is included in the community is performed using at least one of an email, a text message, a telephone call, a voicemail, or a mobile app that is executing on the device of the user.

10. The method of claim 1, further comprising:
the generating of the notification is based on a further user profile that describes the further user and that indicates a further group of users socially connected to the further user by the social network.

11. The method of claim 10, wherein:
the generating of the notification incorporates a third-party description of the community into the notification; and
the providing of the notification includes providing the third-party description.

12. The method of claim 10, wherein:
the generating of the notification incorporates a list of available jobs in the community into the notification; and
the providing of the notification includes providing the list of available jobs.

13. The method of claim 10, wherein:
the generating of the notification incorporates a suggestion that the user initiate a communication with the further user into the notification; and
the providing of the notification includes providing the suggestion that the user initiate the communication with the further user.

14. The method of claim 10, wherein:
the generating of the notification incorporates a suggestion that the user become socially connected with the further user into the notification; and
the providing of the notification includes providing a suggestion that the user become socially connected with the further user.

15. The method of claim 1 further comprising:
providing a further notification that the user is included in the community,
the further notification being provided to a further device of the further user that is socially unconnected to the user by the social network.

16. The method of claim 15, wherein:
the providing of the further notification that the user is included in the community includes providing a suggestion that the further user initiate a communication with the user.

17. The method of claim 15, wherein:
the providing of the further notification that the user is included in the community includes providing a suggestion that the further user become socially connected with the user.

18. A non-transitory machine-readable storage medium comprising instructions that, when executed by one or more processors of a machine, cause the machine to perform operations comprising:
receiving an update to a user profile that describes a user and indicates a group of users socially connected to the user by a social network,
the update referencing a community of the user and being received from a device of the user;
modifying the user profile based on the update by including a reference to the community of the user within the user profile;
identifying a further user that is included in the community and that is socially unconnected to the user by the social network,
the identifying of the further user being performed by the one or more processors of the machine and based on the update that references the community of the user; and
generating and providing a notification that the further user is included in the community,
the generating of the notification incorporating a community profile of the community into the notification,
the notification being provided to the device of the user and including the community profile of the community.

19. The non-transitory machine-readable storage medium of claim 18, wherein:
the providing of the notification that the further user is included in the community includes providing a suggestion that the user initiate a communication with the further user.

20. A system comprising:
a reception module configured to receive an update to a user profile that describes a user and indicates a group of users socially connected to the user by a social network,
the update referencing an employer of the user and being received from a device of the user;
an update module configured to modify the user profile based on the update by including a reference to the employer of the user within the user profile;
a processor configured by an identification module to identify a further user that is employed by the employer and that is socially unconnected to the user by the social network,
the identifying of the further user being based on the update that references the community of the user;
a generation module configured to generate a notification that the further user is employed by the employer,
the generating of the notification incorporating a community profile of the community into the notification; and
a provision module configured to provide the notification that the further user is employed by the employer,
the notification being provided to the device of the user and including the community profile of the community.

21. The system of claim 20 further comprising:
a generation module configured to generate the notification based on a further user profile that describes the further user and that indicates a further group of users socially connected to the further user by the social network.

* * * * *